United States Patent Office 2,819,947
Patented Jan. 14, 1958

2,819,947

PROCESS FOR THE PRODUCTION OF SULFURIC ACID BY THE CONTACT PROCESS

Erich Stahl, Frankfurt am Main, Germany, assignor to Metallgesellschaft Aktiengesellschaft, Frankfurt am Main, Germany No Drawing. Application June 27, 1955
Serial No. 518,339

Claims priority, application Germany July 17, 1954

2 Claims. (Cl. 23—167)

The present invention relates to an improved process for producing sulfuric acid by the contact process and particularly relates to an improved method of supplying the water necessary to bind the $SO_3$ to form sulfuric acid.

In the production of sulfuric acid by the contact process, it is customary to supply a portion of the water necessary to bind the $SO_3$ as water vapor in the $SO_2$ gas stream and to supply the remaining quantity necessary either to the vessel from which the absorption tower is sprayed or to the quantity of sulfuric acid which is removed from the drying tower cycle and pumped to the vessel containing the acid with which the absorption tower is sprayed. As two separate sulfuric acid cycles are maintained for the absorption and drying towers, the concentration of the acid for each tower can be adjusted to that most favorable, and it is customary to spray the absorption tower with 98.5% sulfuric acid.

It has also been proposed to spray the drying and absorption towers from a common collecting vessel containing sulfuric acid, also to which the required quantity of water is added, so that only one acid pump is required for the sulfuric acid plant and the plant is consequently substantially simplified. As a 98.5% acid must be employed for spraying the absorption tower for an acid of this concentration exhibits the lower partial pressure both with respect to water and $H_2SO_4$, the drying tower must also be sprayed with an acid of the same concentration. Even though the acid is diluted during its passage through the drying tower by taking up water vapor, there still is a danger that the concentration of the acid in the upper portion of the drying tower can temporarily go above 98.5%, especially at higher temperatures, so that the $SO_2$ gas takes up vaporized $H_2SO_4$ which can easily lead to corrosion in the following contact apparatus and to the formation of undesired sulfuric acid mists in the absorption tower.

It is the object of the present invention to provide a method of operating a sulfuric acid contact plant in which the acid for the drying and absorption towers is supplied from a common acid vessel over a common pump, whereby the undesired occurrence of vaporized sulfuric acid in the $SO_2$ containing gases supplied from the drying tower to the contact apparatus is avoided with certainty.

According to the invention it was found that this object could be attained by introducing the additional water necessary for binding the $SO_3$ not, as customary, to the vessel containing the sulfuric acid from which both the drying and absorption towers are supplied, but rather directly to the separate acid stream for the drying tower supplied by the common pump just before it is introduced into the drying tower. In this way the concentration of the acid is reduced before it is introduced into the drying tower to such an extent that the danger of having vaporized $SO_3$ or $H_2SO_4$ taken up by the $SO_2$ gas during its passage through the drying tower is completely avoided.

The following examples will serve to illustrate the process according to the invention:

Example 1

A contact process sulfuric acid plant in which the acid for the drying and absorption towers is supplied from a common acid vessel and common pump for the production of 20 tons per day of sulfuric acid monohydrate from sulfur required 50 normal cubic meters of air which at 20° C. and 75% saturation with water vapor contained 0.7 kg. of water. For binding the $SO_3$ produced, 2.55 kg. of water per minute are required so that 1.85 kg. per minute of water were required to be added to the sulfuric acid cycle for the drying tower. When the drying tower was sprayed with 220 kg. of 98.5% sulfuric acid per minute the addition of 1.85 kg. of water per minute thereto before it was introduced into the drying tower reduced the concentration thereof at the upper end inlet of the drying tower to 98%. During the passage of the acid through the drying tower, the acid took up a further 0.7 kg. of water per minute so that the concentration of the acid leaving the bottom of the tower was 97.5%.

The absorption tower of the sulfuric acid plant was simultaneously sprayed with 440 kg. of 98.5% sulfuric acid per minute and 11.35 kg. of $SO_3$ were absorbed therein per minute. The concentration of the acid leaving the absorption tower was 99.3%. A mixture of the acids leaving the drying and absorption tower occurred in the common vessel serving to supply the acid to both the drying and absorption tower cycles and resulted in an average concentration of 98.5% so that sulfuric acid of the desired concentration could be withdrawn from the acid feed lines to each tower.

In some instances it can be expedient to supply the additional water required to the acid stream recycled to the drying tower in the form of diluted sulfuric acid. Of course, in such a case, the quantity of diluted acid is such not only to supply the required amount of water but also to effect the desired dilution of the sulfuric acid entering the drying tower. The following example illustrates this modification of the process according to the invention:

Example 2

A contact process sulfuric acid plant in which the acid for the drying and absorption towers is supplied from a common vessel and common pump for the production of 20 tons per day of sulfuric acid monohydrate required 50 normal cubic meters of air which at 20° C. and 75% saturation with water vapor contained 0.7 kg. of water. When the drying tower was sprayed with 220 kg. of 98.5% sulfuric acid per minute, the addition of 14.6 kg. of 78.0% sulfuric acid thereto before it was introduced into the drying tower reduced the concentration thereof to 97.36%. During the passage of the acid through the drying tower, the acid took up 0.7 kg. of water per minute so that the concentration of the acid upon leaving the bottom of the tower was 97.0%.

The absorption tower of the sulfuric acid plant was simultaneously sprayed with 440 kg. of 98.5% sulfuric acid per minute and 11.35 kg. of $SO_3$ were absorbed therein per minute. The concentration of the acid leaving the absorption tower was 99.3%. A mixture of the acids leaving the drying and absorption tower occurred in the common vessel serving to supply the acid to both the drying and absorption tower cycles and resulted in an average concentration of 98.5% so that sulfuric acid of the desired concentration could be withdrawn from the acid feed lines to each tower.

I claim:

1. In a process for the production of contact sulfuric acid in which sulfuric acid is recycled in separate streams to a drying tower for $SO_2$ containing gases and to an absorption tower for the absorption of $SO_3$ from a common acid vessel containing sulfuric acid of an average concentration of 98.5% with the aid of a common pump and additional water is required beyond that contained in the $SO_2$ containing gases for binding the $SO_3$ in the absorption tower, the step which comprises adding the additional water required for binding the $SO_3$ only to the separate acid stream recycled to the drying tower after it has passed the pump and before it is introduced into the drying tower.

2. The process of claim 1 in which the additional water added to the acid stream is in the form of sulfuric acid more dilute than 98.5%.

References Cited in the file of this patent
UNITED STATES PATENTS

| | | |
|---|---|---|
| 1,233,627 | Weber | July 17, 1917 |
| 2,003,442 | Hechenbleikner et al. | June 4, 1935 |
| 2,047,546 | Clark | July 14, 1936 |
| 2,357,195 | Herrmann | Aug. 29, 1944 |